Figure 1A:
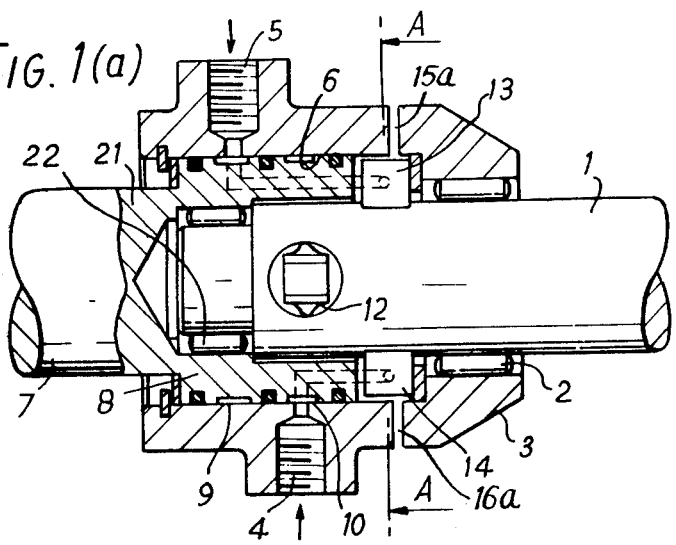

United States Patent [19]

Morgan et al.

[11] 4,174,017
[45] Nov. 13, 1979

[54] VEHICLE POWER ASSISTED STEERING APPARATUS

[75] Inventors: Peter D. Morgan, Clutton, England; Alistair G. Taig, South Bend, Ind.

[73] Assignee: Bendix Westinghouse Limited, Bristol, England

[21] Appl. No.: 872,273

[22] Filed: Jan. 28, 1978

[30] Foreign Application Priority Data

Jan. 29, 1977 [GB] United Kingdom ............... 3725/77

[51] Int. Cl.$^2$ ............................................. B62D 5/08
[52] U.S. Cl. ..................................... 180/132; 60/407; 91/461
[58] Field of Search ............... 180/132, 146, 148, 154, 180/161; 60/407; 91/461

[56] References Cited

U.S. PATENT DOCUMENTS

| | | | |
|---|---|---|---|
| 3,033,051 | 5/1962 | Reinke et al. | 180/147 X |
| 3,463,260 | 8/1969 | Baines et al. | 180/132 |
| 3,709,099 | 1/1973 | Dumeah | 180/147 X |
| 3,741,074 | 6/1973 | Oxley et al. | 180/147 X |
| 3,948,338 | 4/1976 | Toshioka et al. | 180/147 |

FOREIGN PATENT DOCUMENTS 2615626 10/1976 Fed. Rep. of Germany ............. 91/461

*Primary Examiner*—John A. Pekar
*Attorney, Agent, or Firm*—Paul David Schoenle; Ken C. Decker

[57] ABSTRACT

A steering system includes a sensor device which is responsive to excessive steering effort to actuate a power assist for steering. A housing rotatably receives an input member and an output member which are rotatable relative to each other when the steering effort is excessive. The housing includes an inlet communicating with a source of pressurized air and an outlet opening to atmosphere. The input member and output cooperate to define a passage communicating the inlet with the outlet such that limited rotation between the input member and output member varies the communication of pressurized air through the passage. When the communication of pressurized air through the passage is varied, a relay valve in communication with the inlet is operable to actuate the power assist.

1 Claim, 4 Drawing Figures

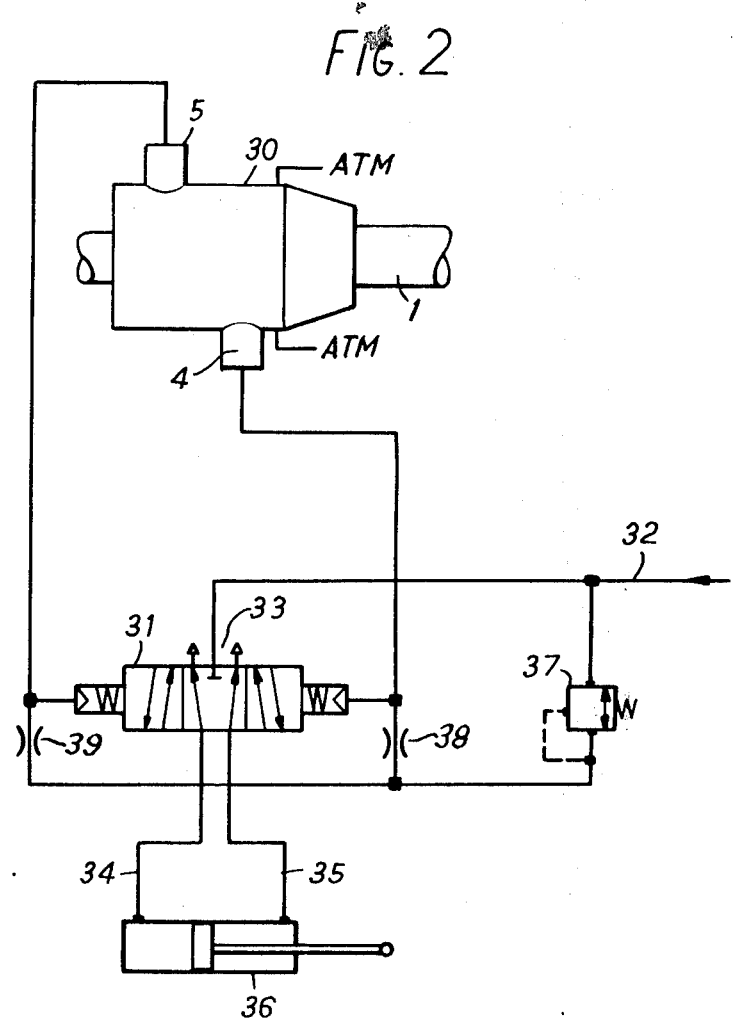

VEHICLE POWER ASSISTED STEERING APPARATUS

This invention relates to power assisted steering apparatus and relates particularly to an improvement of power steering apparatus for enabling assistance to be afforded to the driver at times when the steering loads are inclined to be excessive such as when parking vehicles.

In the Specification of co-pending British Patent Application No. 17785/75, there is described and claimed a power assisted steering apparatus including a steering force input member coupled to a power assisted steering mechanism operable to amplify the force transmitted from the member to provide an amplified force via a steering force output member and including steering input force sensing means operable to signal operation of a secondary power assistance mechanism to supplement the force exerted on the output member by said power assisted steering mechanism.

In the Specification of co-pending British Patent Application No. 32584/76 there is described an improvement in or modification of the apparatus claimed in the aforementioned co-pending Application which consists of vehicle power assisted steering apparatus including a steering force input member coupled to a main power assisted steering mechanism operable to amplify the force transmitted from the member to provide an amplified force via a steering force output member and including means operable in response to a sensed demand for more than a predetermined magnitude of said amplified force for rendering the secondary power assistance means operable to supplement the steering forces applied to steering wheels of the vehicle.

The present invention provides a further improvement in or modification of the proposals in the aforementioned co-pending Patent Application, wherein the input force sensing means comprises an air pressure operable valve device incorporated in the vehicle steering wheel shaft and operable to provide fluid pressure signals to a fluid pressure responsive valve arrangement for relaying supply pressure to the secondary power assistance means.

By virtue of the present invention, the sensing means may be of relatively light construction and in view of the pressure of and volume of air utilised by the input force sensing means can provide for a low air consumption and a high degree of sensitivity.

Figure 1B:
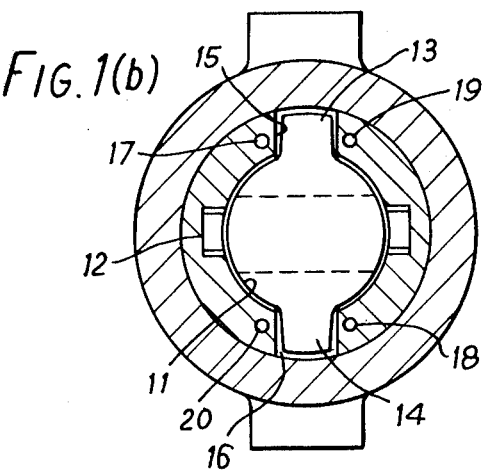
Figure 1C:
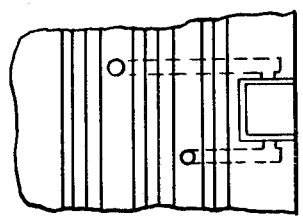

In order that the invention may be more clearly understood and readily carried into effect, the same will be further described by way of example with reference to the accompanying drawings of which FIGS. 1A, 1B, Section AA of FIG. 1(b) and FIG. 1(c), illustrate sectional view of a force sensing means suitable for use in apparatus according to the present invention and FIG. 2 illustrates in schematic form the relevant parts of a system utilising the invention.

Referring to FIG. 1, the input force sensing means comprises a steering force input member comprising the wheel-carrying portion 1 of a steering shaft of a steering mechanism of a road vehicle. The shaft 1 is rotatable in a bearing 2 in a generally cylindrical housing 3 which is provided with two input ports 4 and 5 tapped to take pneumatic pipe connections. Also rotatable within an inner cylindrical portion 6 of the housing 3 there is the steering gear shaft 7 which is provided with a cylindrical end portion 8 having annular grooves 9 and 10 with seals on either side thereof to provide isolation between connections from the ports 5 and 4 respectively. The cylindrical end portion 8 is provided with an internal space 11 shaped as shown in FIG. 1B to accommodate with some rotational clearance a correspondingly shaped end part of the shaft 1, this being normally constrained by virtue of leaf springs 12 to adopt a generally centralised position with opposing lugs 13 and 14 centrally disposed in corresponding spaces 15 and 16 having atmospheric ports 15a and 16a. Passages are provided between the port 4 and passages 17 and 18 and between the port 5 and passages 19 and 20. The passages 17, 18, 19 and 20 opening to present themselves as parts to opposing faces of the lugs 13 and 14. Beyond the mentioned portion of the shaft 1, a spigot 21 provides for location of the end of shaft 1 within the cylindrical part 8 in a bearing 22.

Referring now to FIG. 2, this shows by the general outline 30, a sensing means as described above with reference to FIGS. 1(a) (b) and (c), the ports 4 and 5 being connected on the one hand to opposite sides of a pneumatic relay valve 31 and also in common via respective chokes 38 and 39 and a pressure reducing valve 37 to a source of supply pressure on an input line 32. Line 32 is assumed to be connected to a vehicle reservoir, not shown, charged from the compressor driven by the vehicle engine. The line 32 also provides an air pressure input at 33 to the control valve 31. The valve 31 has left and right-hand outputs on lines 34 and 35 connected to opposite sides of a double-acting piston actuator 36 which is assumed to be coupled to the steering drag linkage of the vehicle to provide secondary assistance when dictated by a sensed loading on the shaft 1 as sensed by the device 30.

In operation, it is assumed that the steering mechanism is provided with normal hydraulic power assistance controlled by a valve from the output of the shaft 7 and for light applications the power assistance will be limited to that available from the normal hydraulic power assistance responding to forces transmitted between the shaft portion 1 and the shaft 7 by virtue of the leaf springs 12 which maintain centralised positions of the lugs 13 and 14 within the cavity 11 of the member 8.

The housing 3 is held in a fixed position by suitable mountings to the vehicle body.

In the event of more than a predetermined magnitude of force being experienced by the shaft 1, deflection against springs 12 of lugs 13 and 14 takes place relative to spaces 15 and 16 and in the extreme the lugs 13 and 14 engage the part 8 at 15 or 16 respectively. In normal running without such deflection, the air supply on the line 32 is applied to the valve 31 and with equal pressure division between 39 and valve 30 and between 38 and valve 30, this gives rise to no output on line 34 or line 35 since the pressures at ports 4 and 5 of the force sensing means 30 are opposite. With deflection of the lugs 13 and 14 as aforementioned however and assuming that lug 13 moves towards port 17 whilst lug 14 moves towards port 18, this gives rise to increased pressure upstream of the port 4 and reduced pressure upstream of the port 5, with a result that unbalance in the pressures applied to the valve 31 from ports 4 and 5 occurs which, when sufficient to overcome built-in centralising spring biasses within the valve 31, switches the valve 31 to produce a secondary power assistance pressure in the line 34 to the double-acting cylinder 36. This acts in the sense to assist the normal power assistance for parking or slow driving conditions for the vehicle. Similarly, with operation in the other direction, wherein the lugs 13 and 14 move towards ports 19 and 20, the resultant pressure upstream from port 5 exceeds the pressure upstream of port 4 with a result that the valve 31 is operated by a sufficient such difference to feed supply pressure from the line 33 to the output line 35 and to the other side of the double-acting cylinder 36.

Whilst the present invention has been described in the foregoing with more particular reference to the to the use of the sensing means incorporated in a steering shaft for signalling operation of a secondary power assistance, the shaft included force sensing means may in certain applications be employed to signal the operation of a primary or only power assistance mechanism for a vehicle. In this case the force sensing means will be responsive to much lower forces to initiate the power assistance.

We claim:

1. In a steering system having a rotatable input member coupled to a rotatable output member, the input member and output member cooperating to substantially define a sensor, a relay valve communicating pressurized air to atmosphere via the sensor, the relay valve also communicating with an actuator which is engageable with a linkage member in the steering system, the input member being rotatable relative to the output member to vary communication of pressurized air via the sensor, the relay valve being movable in response to the variation of pressurized air communication from a neutral position to an unbalanced position, the relay valve communicating pressurized air to the actuator in the unbalanced position to move the linkage of the steering system, the sensor comprising a first space and a second space on the output member and a first lug and a second lug on the input member extending into the first and second spaces, respectively, a first inlet port communicating via a first set of passages within the output member with the first and second spaces, and a second inlet port communicating via a second set of passages within the output member with the first and second spaces, the first and second spaces opening to atmosphere and the first and second lugs being movable within the first and second spaces, respectively, in order to vary communication through the spaces to atmosphere when the input member is rotatable relative to the output member.

* * * * *